E. SULLIVAN.
MOLDING BRANCH BLOCK.
APPLICATION FILED APR. 17, 1906.
926,148.
Patented June 29, 1909.
2 SHEETS—SHEET 1.
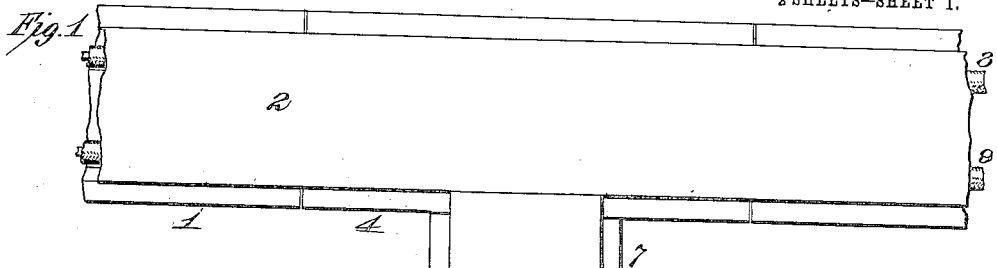
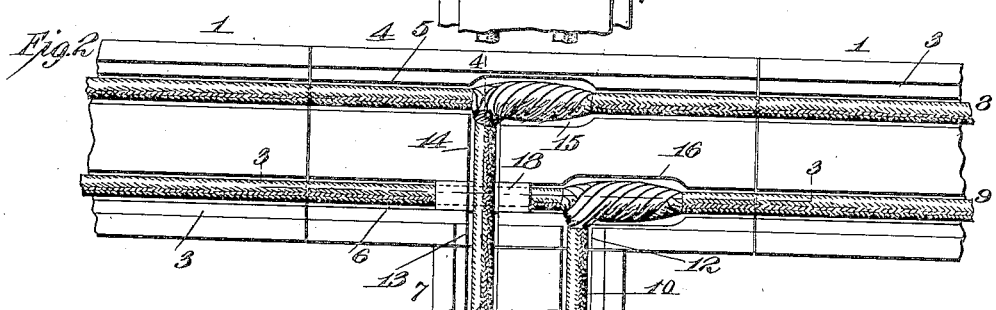
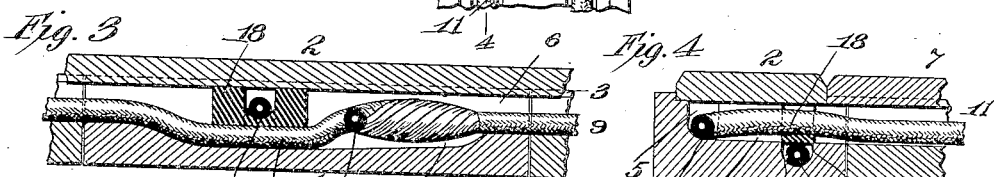
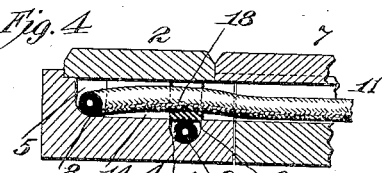
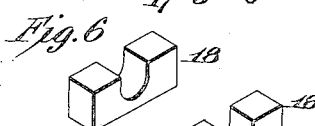
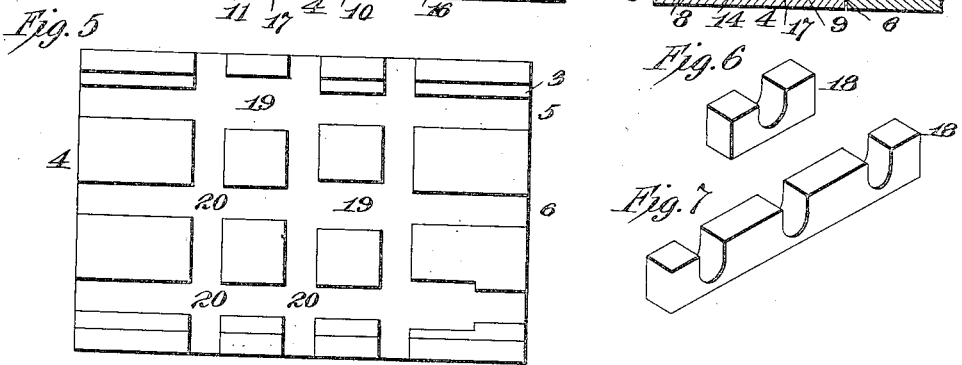
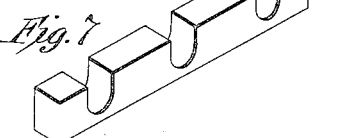
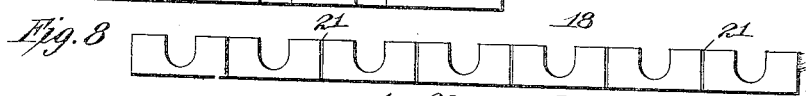
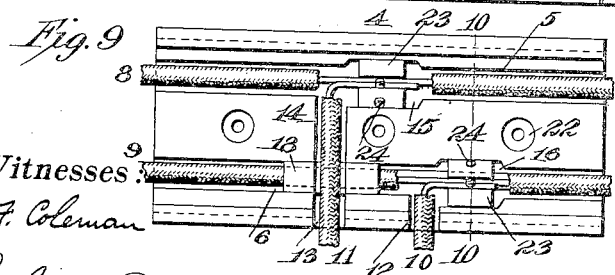
Witnesses:
J. F. Coleman
John S. Tobch
Inventor
Edward Sullivan
By Dyer & Dyer
Attorneys.

E. SULLIVAN.
MOLDING BRANCH BLOCK.
APPLICATION FILED APR. 17, 1906.
926,148.
Patented June 29, 1909.
2 SHEETS—SHEET 2.
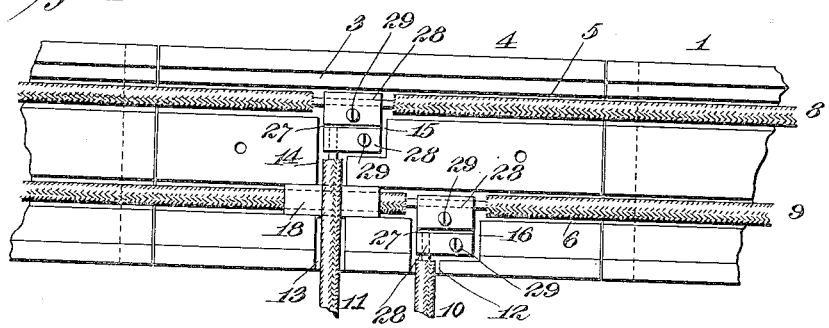
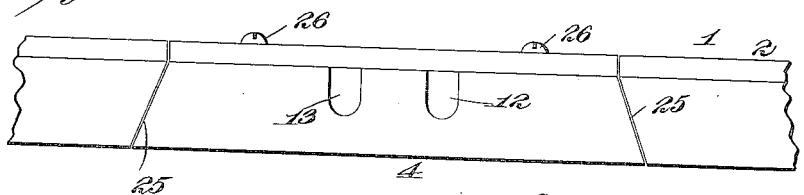
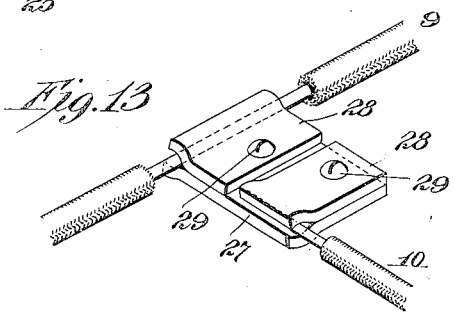
Witnesses:
J. F. Coleman
John Potsch
Inventor
Edward Sullivan
By Dyer & Dyer
Attorneys.

UNITED STATES PATENT OFFICE.

EDWARD SULLIVAN, OF NEW YORK, N. Y., ASSIGNOR OF ONE-HALF TO JORDAN BROTHERS, OF NEW YORK, N. Y., A COPARTNERSHIP.

MOLDING BRANCH BLOCK.

No. 926,148.  Specification of Letters Patent.  Patented June 29, 1909.

Application filed April 17, 1906. Serial No. 312,078.

*To all whom it may concern:*

Be it known that I, EDWARD SULLIVAN, a citizen of the United States, residing in the borough of Brooklyn, city of New York, State of New York, have invented a certain new and useful Improvement in Molding Branch Blocks, of which the following is a description.

The objects I have in view are to produce a device to be used in making branches in connection with interior wiring.

The objects I seek to attain are to reduce the cost of installing interior wiring by making the branches more simple than heretofore, and to reduce the amount of work in putting them up.

Further objects are to produce a device which will not be unsightly and will avoid the heavy loom with the extra insulation which has ordinarily been required in making simple branch connections in interior wiring.

Further objects will appear from the following specification and accompanying drawings.

I attain these objects by the mechanism illustrated in the accompanying drawings, in which—

Figure 1 represents a plan view of a section of molding showing a single branch; Fig. 2 is a similar view showing the capping removed; Fig. 3 is a section of the center molding block taken on the line 3—3 of Fig. 2; Fig. 4 is a section of the same block and a portion of the molding taken on the line 4—4 of Fig. 2; Fig. 5 is a plan view of a block adapted to carry three mains and to connect to a double 3-wire branch; Fig. 6 is a perspective view of the insulating saddle or staple placed at the crossover; Fig. 7 is one form of insulating saddle or staple to be used in connection with a block for a 4-wire main; Fig. 8 is a view of a modified form of saddle or staple; Fig. 9 is a plan view of a modified form of block, with the capping removed; Fig. 10 is a sectional view thereof, with the capping in place; Fig. 11 is a plan view of another modification, with the capping removed; Fig. 12 is a side view thereof, with the capping in place, and Fig. 13 is an enlarged perspective view of a form of clip useful in connecting with the construction shown in Figs. 10 and 11.

In all of the views like parts are designated by the same reference characters.

In carrying out my invention, I provide the usual molding 1, which is usually formed of definite commercial shapes and sizes. This molding is provided with one, two, three or more grooves for carrying that many mains. The wires of the mains are led within the grooves and the whole is covered by a capping 2, which is made in strips of convenient length and rests within shoulders 3 formed in the molding. In order to make a connection with a branch, the ends of sections of molding 1 at the proper place are interrupted a sufficient distance apart so that the block 4 may be inserted. This block is of the same width and depth as the molding which it is used in connection with, and is provided with shoulders similar to those on the molding, and also with grooves 5, 6 which correspond with the similar grooves in the molding. It is to be understood that if the molding has one, two, three or more grooves, the block has a similar number. While the molding is usually made of wood or metal, the block may be made of wood, metal or any other material, but I prefer to use porcelain, which is very cheap to manufacture and is favorably regarded by fire underwriters. This branch block is in the form of a section of molding.

The branch wires are carried within the molding 7, which is located adjacent to the center of the block 4. The molding 7 is provided with as many grooves as there are branch wires. Such grooves may be one, two, three or more in number. In Figs. 1 and 2 but a single branch is shown as taken off at the block 4, but when desired, the main may be tapped at both sides and branch moldings placed upon both sides of the block, as will be explained. In Figs. 1 and 2 there are two main wires 8 and 9, and two branch wires 10 and 11. As shown, the wires 9 and 10 are connected together, and the wires 8 and 11 are also connected together. To permit this connection to be made, notches 12 and 13 are made in the shoulder 3 of the block 4 at such a position that they will come opposite the grooves in the molding 7. A notch 14 is also made in the web which separates the two grooves of the block. These notches are sufficiently wide and deep to carry the wires 10 and 11. In order to connect the wires together, the insulation is removed from the wires 8 and 9 for a sufficient distance and adjacent to the notches 12 and 13, and the insulation is also stripped from the ends of the wires 10 and 11, and they are secured to the main wires by twisting the branch wires around the main wires. The wires may be further secured by soldering and wrapping with insulating tape. Other means of securing the wires together may be utilized without departing from the invention. In order to permit the joint between the wires to rest within the block, the grooves 5 and 6 are enlarged at 15 and 16 as shown. In order to permit the branch wire 11 to cross the wire 9 without extending outside of the capping, the groove 6 is deepened at 17 adjacent to the notch 13. This groove is deepened a sufficient distance to permit the two wires 9 and 11 to cross at this point. In order to prevent danger of cross-circuit between the wires 9 and 11 at the crossover, an insulating saddle or staple 18 is placed between the two wires. This saddle or staple is preferably formed of the shape shown in Fig. 6, and is preferably made of porcelain, although any other suitable insulating material may be used.

The block 4 is supported in position by the capping 2, which extends over it from one or the other adjacent molding and snugly rests within the shoulders 3. The capping is secured to the molding in the usual manner, such as by nails, which may be driven into the center web which separates the grooves.

Fig. 5 shows a molding block which may be used in connection with three mains and three branch wires on each side. Here suitable enlargements are made at 19 to permit the joints between the mains and branch wires to lie snugly within the capping, and the grooves are deepened at 20, to permit the wires to cross. In connection with such a block, the form of saddle or staple shown in Fig. 7 could be employed, which would cover three cross-overs simultaneously.

A modified form of saddle or staple is shown in Fig. 8, in which a number of saddles are formed together of porcelain or other suitable material, and are separated by deep grooves 21. These permit the saddles to be broken off in sections of one, two, three or more, as desired. The notches in the saddles should be properly proportioned so as to be applied to the form of block with which they are to be used. The capping may be formed of the same material as the block, for instance, porcelain. Fig. 10 shows a capping of insulating material. This capping has a dovetailed joint with the block, by means of which it is held in place.

Screws or nails may be used with any form as an additional means for supporting the block. Openings 22 for this purpose are shown in Fig. 9.

In Figs. 9 and 10 a useful device for connecting the wires together, is shown. This consists of a block 23 of metal or other suitable material, having a notch in which the wires lie, and a screw 24 for forcing them into mutual contact. The enlargements 15 and 16 are of the proper size and shape to accommodate these coupling devices.

In Figs. 11 and 12 the block is shown as formed with beveled edges 25; the ends of the adjoining molding strips being similarly beveled. This supports the block in place without further support. The capping for the block is shown as of the same length as the block, and is secured in place by screws 26.

In Figs. 11, 12 and 13 is shown a modified form of coupling device. This consists of a plate 27 having smaller plates 28 thereon, secured to it by screws 29. The wires are clamped between the plates as shown, the edges of the plates being bent or curved to form a channel as shown to improve the hold upon the wires.

A branch molding is not necessary, as the branch wires can lead off under cleats or into a conduit.

It is to be understood that the invention can be applied to molding branch blocks which are used to take off a branch from a branch as well as branches from the mains.

In accordance with the provisions of the patent statutes, I have described the principle of operation of my invention together with such forms as I now consider to be the best embodiment thereof, but I desire it understood that I do not limit myself to the exact forms shown, as the invention may be carried out by other means.

Having described my invention, what I claim as new and desire to secure by Letters Patent, is:

1. In combination with two adjacent ends of a molding, and a capping secured thereto, of a branch block interposed between such ends and having grooves for the mains and branches, and shoulders, the said shoulders engaging with the capping, the engagement of said capping with the shoulders forming the sole means for support of the block.

2. A porcelain branch block having grooves for the mains and the branches including a cross-over, one groove being notched at the cross-over, in combination with a separable notched saddle of porcelain located at the cross-over, the notch at the saddle being opposed to the groove.

3. An improved saddle for use with a branch block, which comprises a strip of porcelain having notches therein, the said notches being separated by grooves permitting fracture at these points.

This specification signed and witnessed this 9th day of April, 1906.

EDWARD SULLIVAN.

Witnesses:
LEONARD H. DYER,
AUG. LONG.